US006789092B1

(12) United States Patent
Oppedahl et al.

(10) Patent No.: US 6,789,092 B1
(45) Date of Patent: Sep. 7, 2004

(54) STATUS MONITORING SYSTEM

(75) Inventors: Carl Oppedahl, Dillon, CO (US); Thomas C. Bennett, Nikiski, AK (US)

(73) Assignee: Oppedahl & Larson, LLP, Dillon, CO (US)

( * ) Notice: Subject to any disclaimer, the term of this patent is extended or adjusted under 35 U.S.C. 154(b) by 597 days.

(21) Appl. No.: 09/704,505

(22) Filed: Nov. 1, 2000

Related U.S. Application Data

(60) Provisional application No. 60/162,653, filed on Nov. 1, 1999.

(51) Int. Cl.[7] .................................................. G06F 7/00
(52) U.S. Cl. ..................... 707/104.1; 707/100; 707/102
(58) Field of Search .................... 707/1–10, 100–104.1; 700/11, 27, 83, 95, 96, 223, 224, 225–227

(56) References Cited

U.S. PATENT DOCUMENTS

| | | | | |
|---|---|---|---|---|
| 5,819,272 A | * | 10/1998 | Benson ........................... | 707/8 |
| 5,995,939 A | * | 11/1999 | Berman et al. ................. | 705/3 |
| 6,018,713 A | * | 1/2000 | Coli et al. ....................... | 705/2 |
| 6,122,636 A | * | 9/2000 | Malloy et al. ............... | 707/102 |
| 6,131,109 A | * | 10/2000 | Ueki et al. ................... | 709/107 |
| 6,253,188 B1 | * | 6/2001 | Witek et al. .................. | 705/14 |

OTHER PUBLICATIONS

Palm User Guide, the Patent Application Locating and Monitoring System, "United States Patent and Trademark Office", Ju 1993, pages Advanced 18–23, Intro 1–2.*

* cited by examiner

*Primary Examiner*—Greta Robinson
*Assistant Examiner*—Linh Black
(74) *Attorney, Agent, or Firm*—Oppedahl & Larson LLP

(57) ABSTRACT

A method is described for use with a server serving requested records among a multiplicity of records, and with a predetermined list of record identifiers, and with a first file containing information about records corresponding to the record identifiers. The method comprises the steps of: selecting at least two of the record identifiers from the list; for each one record identifier of the record identifiers: presenting a request to the server with respect to the record identifier; receiving a record from the server, said record corresponding to the record identifier; parsing the record, thereby deriving received information of interest from the record; comparing the received information of interest with corresponding information in the first file; and annunciating any difference between the received information of interest and the corresponding information in the first file.

19 Claims, 2 Drawing Sheets

STATUS MONITORING SYSTEM

This application claims priority from U.S. application Ser. No. 60./162,653 filed Nov. 1, 1999, incorporated herein by reference.

BACKGROUND

The Internet has given rise to opportunities for ready availability of information that was heretofore only available by more cumbersome means such as telephone calls and inquiries presented in person or by written correspondence. Shippers provide package tracking information on web sites; for example, the U.S. Postal Service provides tracking information regarding Express Mail packages on a web site. The U.S. Patent and Trademark Office provides trademark status information on a web site called TARR (Trademark Application and Registration Retrieval). The U.S. Patent and Trademark Office provides patent application status information on a web site called PAIR(Patent Application Information Retrieval). The PAIR site is provided with a means for establishing a cryptographically secure communications channel so that third parties are unlikely to be able to intercept the patent application status information electronically.

Unfortunately, many of these web sites have the drawback that it is extremely tedious to check the status of many records. On the web site of the U.S. Postal Service, if it is desired to check the status of several Express Mail packages, the user is forced to hand-type each of the tracking numbers one by one into the server. This not only takes time but also presents the risk that the user may, through inadvertence, type a tracking number incorrectly. A further risk is that the user, checking a list multiple tracking numbers, may forget to check one of the tracking numbers.

Yet a further drawback is that the user is reduced to having to manually (visually) check the present status (as reported on the web site) with the previous status (perhaps reported on a paper printout from a previous status check). This task is tedious, requires awkward paper records, and is error-prone. A human user might not notice that some obscure item of status has changed since the previous status check.

On the TARR web site, the user is likewise forced to type in serial numbers or registration numbers one by one. Each one can be mistyped through inadvertence. Serial numbers or registration numbers can be inadvertently omitted, leading to the unfortunate result that the status is not checked. When status reports are provided by the TARR server, the reports contain lots of information and it is tedious and error-prone to check manually for changes in status from a previous status check.

On the PAIR web site, the user is likewise forced to type in serial numbers or patent numbers one by one. Each one can be mistyped through inadvertence. Serial numbers or patent numbers can be inadvertently omitted, leading to the unfortunate result that the status is not checked. When status reports are provided by the PAIR server, the reports contain lots of information and it is tedious and error-prone to check manually for changes in status from a previous status check. A user may wish to check for new records that are available from the server that match a particular customer number, and this check may result in identifying new records that need status updates. This step is also tedious and risks error, for example if there is new record and if the user fails to notice that a record is new.

All of these steps take a very long time. A U.S. patent law firm with a modest-sized docket (e.g. 200 patent files and 200 trademark files) can spend an entire day trying to obtain status changes on its pending files, and tracking the status of the Express Mail packages which it has sent to the Patent Office.

There is thus a great need for a method and system which avoid tedium, which are not error-prone, and which obtain their results quickly.

SUMMARY OF THE INVENTION

A method is described for use with a server serving requested records among a multiplicity of records, and with a predetermined list of record identifiers, and with a first file containing information about records corresponding to the record identifiers. The method comprises the steps of: selecting at least two of the record identifiers from the list; for each one record identifier of the record identifiers: presenting a request to the server with respect to the record identifier; receiving a record from the server, said record corresponding to the record identifier; parsing the record, thereby deriving received information of interest from the record; comparing the received information of interest with corresponding information in the first file; and annunciating any difference between the received information of interest and the corresponding information in the first file.

DESCRIPTION OF THE DRAWINGS

The invention is described with respect to a drawing in several figures, of which.

DETAILED DESCRIPTION

Figure 1:
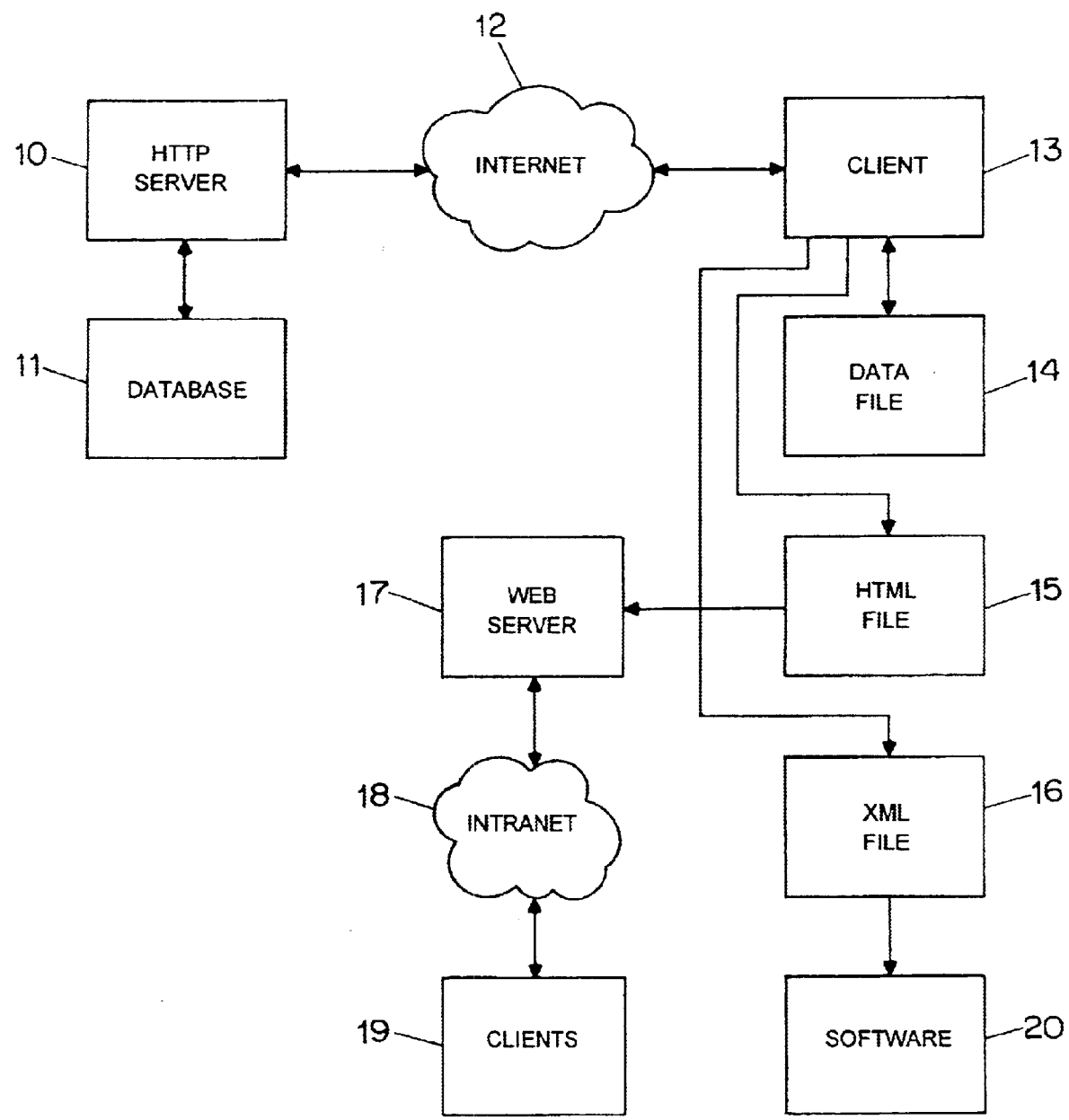
FIG. 1 shows a system according to the invention.

A portion of FIG. 1 can be used to describe the prior art. A hypertext transfer protocol (HTTP) server 10 provides information via the Internet 12, drawn from a database 11. The HTTP server may be for example the above-mentioned PAIR, TARR, or USPS servers.

In the system according to the invention, a client 13 is preferably a personal computer located at a user's premises, for example an intellectual property law firm omitted for clarity in FIG. 1. The client 13 runs software according to the invention which performs most of the steps described herein.

As mentioned earlier, the server 10 serves requested records among a multiplicity of records from a database 11. The client 13 draws upon a predetermined list of record identifiers stored in a data file 14. For convenience the file 14 may also contain information about records corresponding to the record identifiers. As mentioned below, however, the invention does not require that the list of record identifiers be stored in the same data file as the information about records.

The client 13 then performs an update. This update may be manually initiated by a user, or may be an automated process such as a Windows service or a Linux cron job. The client 13 selects at least one record identifier, though in most cases the client 13 will select at least two of the record identifiers from the list, and in some cases the client 13 will select all records matching a criterion or may match all records in the database.

In a preferred embodiment, each record identifier has associated with it a "frequency" relating to how often it is desired to perform an update. This may be daily, weekly, monthly, or never, in an exemplary system. The client 13 will then select records based on whether each record is scheduled for an update on the present day.

The client 13, for each one record identifier of the record identifiers, performs a number of steps. It presents a request to the server with respect to the record identifier. It receiving a record from the server, the record corresponding to the record identifier. (Another possible outcome is a timeout if, for example, the server fails to respond timely.)

The client 13 parses the record, thereby deriving received information of interest from the record. This is a nontrivial task, especially considering that the U.S. Postal Service or the U.S. Patent and Trademark Office may, without warning, change the format or syntax of its web page status reports, thus crippling the status monitoring software according to the invention. Parsed information is obtained from the HTTP response. For example, in the case of a trademark record, the parsing software extracts the filing date, the examining group, the expected publication date, the most recent status, and other information. In the case of a patent record, the parsing software extracts the examiner's name, the group art unit, the foreign priority data, the continuity data, and the most recent status, among other information.

The client 13 then compares the received information of interest with corresponding information in the first file 14. It annunciates any difference between the received information of interest and the corresponding information in the first file 14. This is preferably done by sending email to predetermined recipients and by flagging such events by means of distinctive characters on a status display screen and in the HTML and XML files mentioned below.

In the general case, the client 13 replaces the information in the first file 14 with the received information of interest. This means that the system has current status information which may be compared on future days with status information retrieved in the future.

It is desirable in addition to have the client 13 create or update an extensible markup language (XML) file 16 which may be processed by other software 20. In addition, it is desired to create or update a hypertext markup language (HTML) file 15 containing the information in the first file 14 but in HTML form. Such a file is preferably then served by means of a web server 17, via an intranet 18, to clients 19 within the intellectual property law firm, again omitted for clarity in FIG. 1.

Those skilled in the art will appreciate that the protocol used between client 13 and server 10 are necessarily determined by the server 10. In the present day, the served records are in the hypertext markup language file and the server 10 is a hypertext transfer protocol server, which means that the client 13 must be an HTTP client receiving and parsing HTML data. If the server 10 were serving XML records, then the client 13 would have to receive and parse XML data. While the latter is desirable from the programming point of view, the designer of the client 13 is constrained by the decisions made by the operator of the server 10, for example the U.S. Postal Service or the United States Patent and Trademark Office.

Figure 2:
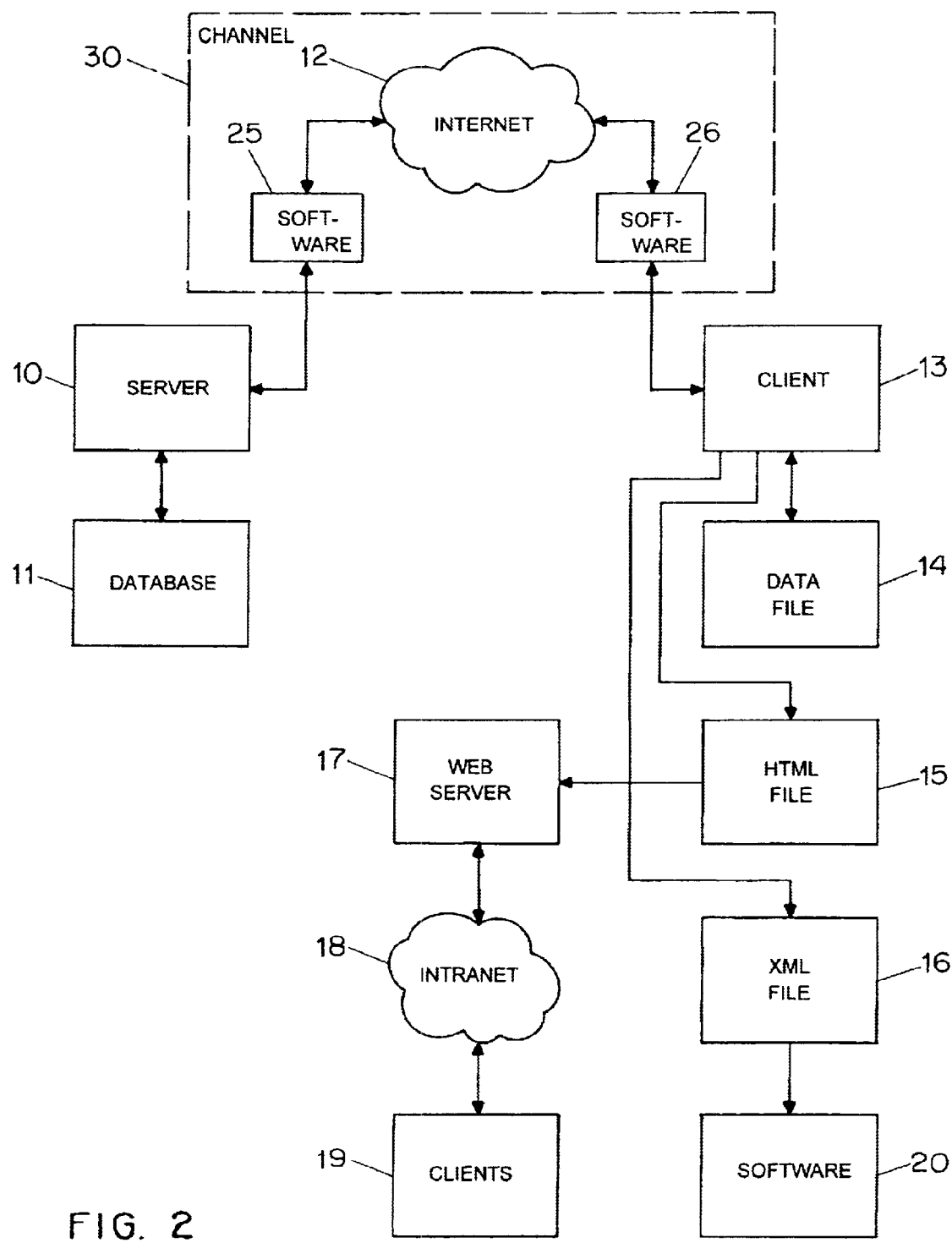
FIG. 2 shows a system according to the invention in the particular case of a system employing a cryptographically secure communications channel.

FIG. 2 shows how the system of FIG. 1 changes when a cryptographically secure communications link with the server is employed. In the case of the PAIR server, the U.S. Patent and Trademark Office has determined that the user will employ software called USPTO Direct 26 which, together with corresponding software 25, creates a cryptographically secure channel 30 between the server 10 and the client 13. Those skilled in the art will appreciate that the particular cryptographic approach employed is not material to the invention, and that other approaches such as point-to-point tunneling protocol or SSH protocol could just as well be used, a decision likewise not material to the invention.

In the case of PAIR, the the record identifiers are patent application serial numbers or patent numbers. In the case of TARR, the record identifiers are trademark application serial numbers or trademark registration numbers. In the case of Express Mail, the record identifiers are package tracking numbers.

The PAIR server presents an additional opportunity for the designer of the client 13. The client 13 can request from the server 10 all record identifiers matching a predetermined criterion such as the customer number, and can add any new record identifiers to the predetermined list of record identifiers. Stated differently, the client 13 can compare the retrieved list of serial numbers and compare it with those stored in data file 14, and can annunciate new serial numbers. This can happen for example if a newly filed patent application finds its way into PAIR, or if an existing patent application comes to have the user's customer number associated with it.

Those skilled in the art will have no difficulty devising obvious enhancements and improvements to what is described here, all without departing from the invention, all of which are intended to be encompassed within the claims which follow.

What is claimed is:

1. A method for use with a server serving requested records among a multiplicity of records, and with a predetermined list of record identifiers, and with a first file containing information about records corresponding to the record identifiers, the method comprising the steps of:

selecting at least two of the record identifiers from the list;

for each one record identifier of the record identifiers:

presenting a request to the server with respect to the record identifier;

receiving a record from the server, said record corresponding to the record identifier;

parsing the record, thereby deriving received information of interest from the record;

comparing the received information of interest with corresponding information in the first file; and annunciating any difference between the received information of interest and the corresponding information in the first file;

further comprising the step, performed after the parsing step, of replacing the information in the first file with the received information of interest;

further comprising the step of creating or updating an extensible markup language file containing the information in the first file.

2. A method for use with a server serving requested records among a multiplicity of records, and with a predetermined list of record identifiers, and with a first file containing information about records corresponding to the record identifiers, the method comprising the steps of:

selecting at least two of the record identifiers from the list;
for each one record identifier of the record identifiers:
: presenting a request to the server with respect to the record identifier;
receiving a record from the server, said record corresponding to the record identifier;
parsing the record, thereby deriving received information of interest from the record,
comparing the received information of interest with corresponding information in the first file; and
annunciating any difference between the received information of interest and the corresponding information in the first file, further comprising the step, performed after the parsing step, of replacing the information in the first file with the received information of interest;

further comprising the step of creating or updating hypertext markup language file containing the information in the first file.

3. A method for use with a server serving requested records among a multiplicity of records, and with a predetermined list of record identifiers, and with a first file containing information about records corresponding to the record identifiers, the method comprising the steps of
: selecting at least two of the record identifiers from the list;
for each one record identifier of the record identifiers:
: presenting a request to the server with respect to the record identifier;
receiving a record from the server, said record corresponding to the record identifier;
parsing the record, thereby deriving received information of interest from the record;
comparing the received information of interest with corresponding information in the first file; and
annunciating any difference between the received information of interest and the corresponding information in the first file;

wherein the annunciating step further comprises sending email to a recipient.

4. A method for use with a server serving requested records among a multiplicity of records, and with a predetermined list of record identifiers, and with a first file containing information about records corresponding to the record identifiers, the method comprising the steps of:
selecting at least two of the record identifiers from the list;
for each one record identifier of the record identifiers:
: presenting a request to the server with respect to the record identifier;
receiving a record from the server, said record corresponding to the record identifier;
parsing the record, thereby deriving received information of interest from the record;
comparing the received information of interest with corresponding information in the first file; and
annunciating any difference between the received information of interest and the corresponding information in the first file;

wherein the server is a hypertext transfer protocol server, and the presenting and receiving steps are performed according to a hypertext transfer protocol.

5. The method of claim 2 further comprising the step of serving records in the hypertext markup language file on a hypertext transfer protocol server.

6. A method for use with a server serving requested records among a multiplicity of records, and with a predetermined list of record identifiers, and with a first file containing information about records corresponding to the record identifiers, the method comprising the steps of:
selecting at least two of the record identifiers from the list;
for each one record identifier of the record identifiers:
: presenting a request to the server with respect to the record identifier;
receiving a record from the server, said record corresponding to the record identifier;
parsing the record, thereby deriving received information of interest from the record;
comparing the received information of interest with corresponding information in the first file; and
annunciating any difference between the received information of interest and the corresponding information in the first file;

wherein the presenting and receiving steps are performed by means of a cryptographically secure communications link with the server.

7. The method of claim 6 wherein the server is a hypertext transfer protocol server, and the presenting and receiving steps are performed according to a hypertext transfer protocol.

8. A method for use with a server serving requested records among a multiplicity of records, and with a predetermined list of record identifiers, and with a first file containing information about records corresponding to the record identifiers, the method comprising the steps of:
selecting at least two of the record identifiers from the list;
for each one record identifier of the record identifiers:
: presenting a request to the server with respect to the record identifier;
receiving a record from the server, said record corresponding to the record identifier;
parsing the record, thereby deriving received information of interest from the record;
comparing the received information of interest with corresponding information in the first file; and
annunciating any difference between the received information of interest and the corresponding information in the first file;

wherein the record identifiers are trademark application serial numbers.

9. A method for use with a server serving requested records among a multiplicity of records, and with a predetermined list of record identifiers, and with a first file containing information about records corresponding to the record identifiers, the method comprising the steps of:
selecting at least two of the record identifiers from the list;
for each one record identifier of the record identifiers:
: presenting a request to the server with respect to the record identifier;
receiving a record from the server, said record corresponding to the record identifier;
parsing the record, thereby deriving received information of interest from the record;
comparing the received information of interest with corresponding information in the first file; and
annunciating any difference between the received information of interest and the corresponding information in the first file;

wherein the record identifiers are package tracking numbers.

10. A method for use with a server serving requested records among a multiplicity of records, and with a predetermined list of record identifiers, and with a first file containing information about records corresponding to the record identifiers, the method comprising the steps of:

selecting at least two of the record identifiers from the list;

for each one record identifier of the record identifiers:
  presenting a request to the server with respect to the record identifier;
  receiving a record from the server, said record corresponding to the record identifier;
  parsing the record, thereby deriving received information of interest from the record;
  comparing the received information of interest with corresponding information in the first file; and
  annunciating any difference between the received information of interest and the corresponding information in the first file;

further comprising the step of requesting from the server all record identifiers matching a predetermined criterion, and adding any new record identifiers to the first file.

11. The method of claim 10 further comprising the step of annunciating any new record identifiers.

12. The method of claim 11 wherein the annunciating of new record identifiers comprises sending an email message.

13. The method of claim 10 wherein the predetermined criterion comprises matching a customer number.

14. A system for use with a server serving requested records among a multiplicity of records, the system comprising:

a predetermined list of record identifiers;

a first file containing information about records corresponding to the record identifiers;

first means for selecting at least two of the record identifiers from the list;

second means with respect to each one record identifier of the record identifiers for:
  presenting a request to the server with respect to the record identifier;
  receiving a record from the server, said record corresponding to the record identifier;
  parsing the record, thereby deriving received information of interest from the record;
  comparing the received information of interest with corresponding information in the first file; and
  annunciating any difference between the received information of interest and the corresponding information in the first file;

wherein the second means further performs the step, performed after the parsing step, of replacing the information in the first file with the received information of interest;

wherein the second means further performs the step of creating or updating an extensible markup language file containing the information in the first file.

15. A system for use with a server serving requested records among a multiplicity of records, the system comprising:

a predetermined list of record identifiers;

a first file containing information about records corresponding to the record identifiers;

first means for selecting at least two of the record identifiers from the list;

second means with respect to each one record identifier of the record identifiers for:
  presenting a request to the server with respect to the record identifier;
  receiving a record from the server, said record corresponding to the record identifier;
  parsing the record, thereby deriving received information of interest from the record;
  comparing the received information of interest with corresponding information in the first file; and
  annunciating any difference between the received information of interest and the corresponding information in the first file;

wherein the second means further performs the step, performed after the parsing step, of replacing the information in the first file with the received information of interest;

wherein the second means further performs the step of creating or updating a hypertext markup language file containing the information in the first file.

16. A system for use with a server serving requested records among a multiplicity of records, the system comprising:

a predetermined list of record identifiers;

a first file containing information about records corresponding to the record identifiers;

first means for selecting at least two of the record identifiers from the list;

second means with respect to each one record identifier of the record identifiers for:
  presenting a request to the server with respect to the record identifier;
  receiving a record from the server, said record corresponding to the record identifier;
  parsing the record, thereby deriving received information of interest from the record;
  comparing the received information of interest with corresponding information in the first file; and
  annunciating any difference between the received information of interest and the corresponding information in the first file;

wherein the annunciating further comprises sending email to a recipient.

17. A system for use with a server serving requested records among a multiplicity of records, the system comprising:

a predetermined list of record identifiers;

a fist file containing information about records corresponding to the record identifiers;

first means for selecting at least two of the record identifiers from the list;

second means with respect to each one record identifier of the record identifiers for:
  presenting a request to the server with respect to the record identifier;
  receiving a record from the server, said record corresponding to the record identifier;
  parsing the record, thereby deriving received information of interest from the record;
  comparing the received information of interest with corresponding information in the first file; and
  annunciating any difference between the received information of interest and the corresponding information in the first file;

wherein the server is a hypertext transfer protocol server, and the presenting and receiving are performed according to a hypertext transfer protocol.

18. The system of claim 15 further comprising a hypertext transfer protocol server serving records in the hypertext markup language file.

19. A system for use with a server serving requested records among a multiplicity of records, the system comprising:

a predetermined list of record identifiers;

a first file containing information about records corresponding to the record identifiers;

first means for selecting at least two of the record identifiers from the list;

second means with respect to each one record identifier of the record identifiers for:

presenting a request to the server with respect to the record identifier;

receiving a record from the server, said record corresponding to the record identifier;

parsing the record, thereby deriving received information of interest from the record;

comparing the received information of interest with corresponding information in the first file; and annunciating any difference between the received information of interest and the corresponding information in the first file;

further comprising cryptographic means establishing a cryptographically secure communications link with the server.

\* \* \* \* \*

UNITED STATES PATENT AND TRADEMARK OFFICE
CERTIFICATE OF CORRECTION

PATENT NO.        : 6,789,092 B1
APPLICATION NO.   : 09/704505
DATED             : September 7, 2004
INVENTOR(S)       : Oppedahl et al.

It is certified that error appears in the above-identified patent and that said Letters Patent is hereby corrected as shown below:

On title page:

Field (56), References Cited - U.S. Patent Documents please add the following:

| | | | | |
|---|---|---|---|---|
| 5,319,542 A | * | 6/1994 | King et al.................. | 705/27 |
| 5,528,490 A | * | 6/1996 | Hill, Charles E............ | 717/168 |
| 5,727,202 A | * | 3/1998 | Kucala, Gregory R...... | 707/10 |
| 5,884,323 A | * | 3/1999 | Hawkins et al............ | 707/201 |
| 5,907,681 A | * | 5/1999 | Bates et al................ | 709/228 |
| 5,946,697 A | * | 8/1999 | Shen, Shiopyn........... | 715/513 |
| 5,951,652 A | * | 9/1999 | Ingrassia et al............ | 709/248 |
| 5,956,709 A | * | 9/1999 | Xue, Yansheng.......... | 707/3 |
| 6,000,000 A | * | 12/1999 | Hawkins et al............ | 707/201 |
| 6,012,098 A | * | 1/2000 | Bayeh et al................ | 709/246 |
| 6,032,130 A | * | 2/2000 | Alloul et al................ | 705/27 |
| 6,055,516 A | * | 4/2000 | Johnson et al............. | 705/27 |
| 6,125,391 A | * | 9/2000 | Meltzer et al.............. | 709/223 |
| 6,240,426 A | * | 5/2001 | Beyda et al................ | 707/201 |
| 6,275,858 A | * | 8/2001 | Bates et al................. | 709/228 |
| 6,308,201 A | * | 10/2001 | Pivowar et al............. | 709/214 |
| 6,356,920 A | * | 3/2002 | Vandersluis, Kristan A.. | 715/501.1 |
| 6,360,213 A | * | 3/2002 | Wagstaff et al............ | 707/1 |
| 6,377,993 A | * | 4/2002 | Brandt et al............... | 709/227 |
| 6,385,620 A | * | 5/2002 | Kurzius et al.............. | 707/104.1 |
| 6,466,940 A | * | 10/2002 | Mills, Dudley John...... | 707/102 |
| 6,484,176 A | * | 11/2002 | Sealand et al.............. | 707/10 |

US-2002/0112224  8/2002  Cox, David A........ 717/100

Field (56) Other Publications - please add the following:

Programming Worksheets; Power 832 Security System; PC5010
Installation Manual; Power 832 Security System; PC5010

UNITED STATES PATENT AND TRADEMARK OFFICE
CERTIFICATE OF CORRECTION

PATENT NO. : 6,789,092 B1
APPLICATION NO. : 09/704505
DATED : September 7, 2004
INVENTOR(S) : Oppedahl et al.

It is certified that error appears in the above-identified patent and that said Letters Patent is hereby corrected as shown below:

Column 5 - Line 8 - please change " , " to " ; "

Column 5 - Line 13 - please change " , " to " ; "

Column 5 - Line 24 - please insert " ; " after of

Signed and Sealed this

Tenth Day of October, 2006

JON W. DUDAS
*Director of the United States Patent and Trademark Office*